No. 750,091. PATENTED JAN. 19, 1904.
W. J. COOK.
THRESHING MACHINE TOOTH.
APPLICATION FILED APR. 7, 1902.
NO MODEL.
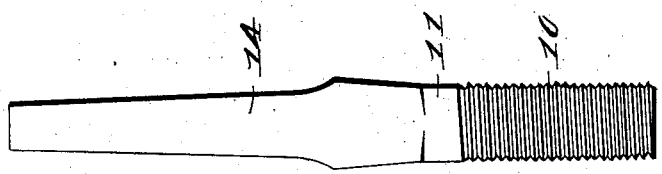
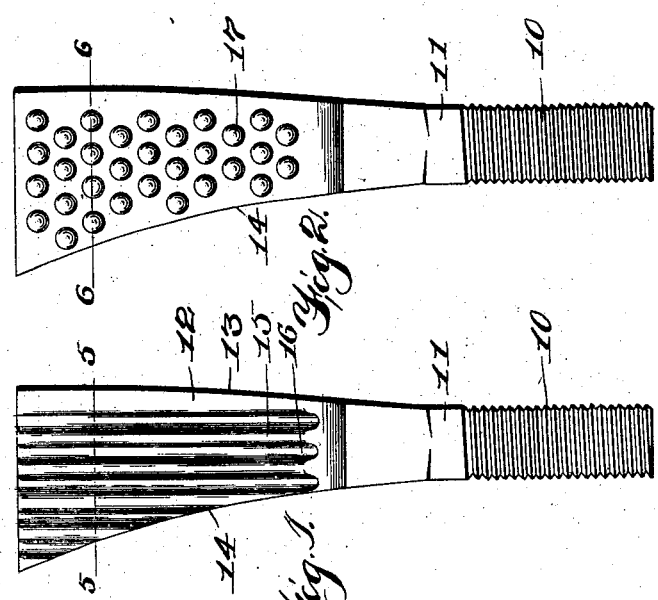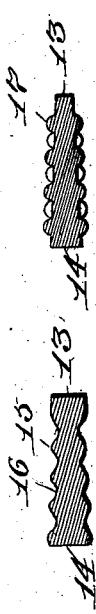
Witnesses: Inventor W. J. Cook,
R. S. Orwig.
J. R. Lowry. by Orwig & Lane Attys.

No. 750,091.

Patented January 19, 1904.

UNITED STATES PATENT OFFICE.

WILLARD J. COOK, OF DEXTER, IOWA.

THRESHING-MACHINE TOOTH.

SPECIFICATION forming part of Letters Patent No. 750,091, dated January 19, 1904.

Application filed April 7, 1902. Serial No. 101,674. (No model.)

*To all whom it may concern:*

Be it known that I, WILLARD J. COOK, a citizen of the United States, residing at Dexter, in the county of Dallas and State of Iowa, have invented certain new and useful Improvements in Threshing-Machine Teeth, of which the following is a specification.

My object is to provide a threshing-machine tooth specially designed for separating wheat, rice, and large grain, in which the kernels might easily be broken and the value of the grain thereby destroyed, in such manner that the threshing-cylinder may be driven with a minimum of power, while effectively separating grain and at the same time the grain will not be broken by contact with sharp or irregular corners.

My invention consists in certain details in the construction, arrangement, and combination of the various parts of the device whereby the objects contemplated are attained, as hereinafter more fully set forth, pointed out in my claim, and illustrated in the accompanying drawings, in which—

Figure 1 shows a side elevation of one of my improved threshing-machine teeth. Fig. 2 shows a like view of a modified form. Fig. 3 shows a rear edge view of my preferred form of tooth. Fig. 4 shows a transverse sectional view through the indicated line 5 5 of Fig. 1. Fig. 5 shows a similar view through the indicated line 6 6 of Fig. 2.

Referring to the accompanying drawings, it will be noted that the complete tooth is substantially the same in exterior contour as that of the ordinary tooth of this class and comprises a round screw-threaded shank 10, an angular surface 11 above the screw-threaded shank, having a head 12 somewhat wider at its top than at its lower end and having two substantially flat sides.

In order to facilitate in the description of my invention, I have used the reference-numeral 13 to indicate the front edge of the tooth-head, and 14 the rear edge thereof. It will be seen by referring to the transverse sectional view that the tooth-head is of less thickness at its front edge than at its rear edge and that the sides gradually taper from the rear to the front edge.

In my preferred form of tooth-head, as shown in Figs. 1 and 4, I have formed on the sides of the head a series of convex ribs 15, extending longitudinally of the tooth, and between these ribs are the convex grooves 16, these ribs and grooves extending substantially throughout the entire length of the head. However, the grooves and ribs are omitted from that portion of the sides of the head adjacent to the front edge thereof, so that as the front edge and outer end wear away the first rib will not have its end exposed in position where it might strike and break the grain.

In the modification shown in Figs. 2 and 5 of the drawings the tooth-head is tapered from a maximum at its rear edge to a minimum at its front edge, the same as in Figs. 1 and 4; but in place of the longitudinal ribs and grooves I provide a number of hemispherical projections 17 on each face.

In practical use and assuming that a cylinder and concave were provided with my preferred form of tooth it is obvious that when grain is fed between the cylinder and concave the cylinder may be rotated with comparatively little power, because the front edges of the teeth are of less thickness than are the front edges of teeth of the ordinary form, and therefore the first impact of the teeth against the grain will not tend to retard the cylinder as much as though the teeth were thicker at their front edges. On account of the tapering sides of the teeth it is obvious that the grain will be rubbed between the sides of the adjacent cylinder and concave teeth, and hence a large part of the wear on the teeth will be thrown to the sides of the teeth instead of on the front edge only, as in the ordinary form of threshing-machine teeth, and, furthermore, on account of the rear edges of the teeth being of substantially the same thicknes as an ordinary tooth of this class it is obvious that grain cannot pass between two adjacent teeth any more readily than it can between teeth of the ordinary thickness throughout. Furthermore, by providing longitudinal ribs and grooves between them I aid materially in the separation of kernels and seeds from the straw by causing the successive ribs to strike against the heads of grain containing the kernels, with the result that each successive rib will violently strike against a head of grain and seeds between two teeth and each rib will have almost the same degree of effectiveness in separating grain and seed as would a similar pair of teeth successively engaging the same head.

In practical use with the ordinary form of threshing-machine teeth, in which the head is of uniform thickness throughout, it has been found out that comparatively all of the wear is thrown upon the front edge of the tooth, and this rapidly wears away in use and makes the tooth ineffective, so that it would be discarded. By my improved tooth the wear is thrown not only on the front edge of the tooth, but on the sides as well, and therefore my improved form of tooth will last comparatively longer, because the wear is distributed not only upon the comparatively narrow edge of the tooth, but on the broad sides of the tooth-head.

The front edge of the tooth is somewhat narrower than the rear edge; but when the front edge strikes a head of grain when being rotated by the cylinder at a considerable speed it will be just as effective in knocking kernels loose from the heads as though it were as wide as the rear edge. Some of the kernels, however, are not easily removed from the hulls, and when a head containing grain not readily separated from the hull is forced between the teeth of this class on a cylinder and a concave each one of the rounded ribs will successively engage the grain, and if the grain is of such size that it will be firmly engaged by the first ribs of two coacting teeth then the kernel will be separated from the hull by these ribs. If, however, the grain is so small that the kernels will not be separated by the first rib, then the succeeding ribs will each strike the grain more forcibly than the preceding ones, so that when the ribs at the rear edges of the teeth engage the grain it will be separated if it can possibly be separated by teeth of this class. It is of particular advantage that the rounded ribs be spaced apart, so that each rib will strike an independent blow upon the grain, and it is also important that the ribs extend from the outer end of the tooth inwardly substantially parallel with the front end of the tooth; otherwise when the forward outer corner of the tooth has been worn away by contact with the grain the end of the front rib might be exposed and form a sharp and irregular corner, which might tend to break the kernels of grain with which they come in contact.

Having thus described my invention, what I claim, and desire to secure by Letters Patent of the United States therefor, is—

A threshing-machine tooth, comprising a shank designed for attachment to a cylinder or concave, a head thereon, a series of smooth convex ribs on each side of the head extended from the outer end of the head inwardly approximately parallel with the front edge of the tooth, spaced apart from each other, and each succeeding rib on each side from the front to the rear projecting farther from the fore-and-aft center of the tooth, said tooth having flat faces on its sides adjacent to the front edge of the tooth, approximating in width that of one of the ribs.

WILLARD J. COOK.

Witnesses:
R. M. SHARP,
JOHN THRAILKILL.